Aug. 27, 1946. T. L. DANIELS 2,406,669
COMBINATION COVERED BUTTER DISH AND TOAST RACK
Filed April 2, 1945

INVENTOR.
Theodore L. Daniels.
BY Corbett, Mahoney + Miller
ATTORNEYS

Patented Aug. 27, 1946

2,406,669

UNITED STATES PATENT OFFICE 2,406,669

COMBINATION COVERED BUTTER DISH AND TOAST RACK

Theodore L. Daniels, Great Neck, N. Y., assignor to Pitman-Dreitzer & Co., Inc., New York, N. Y., a corporation of New York Application April 2, 1945, Serial No. 586,141

2 Claims. (Cl. 65—59)

My invention relates to a combination covered butter dish and toast rack. More particularly, it relates to a covered butter dish having a rack formed on the cover portion which will support a plurality of slices of toast in spaced relation.

In the past, there have been covered butter dishes, but so far as applicant has been able to ascertain, there have been no covered butter dishes combined with a rack for supporting toast or other forms of bread. At the present time, most toast is served on dishes having cover portions dome-like in shape which are used to keep the toast warm, but these types of devices also have a tendency to make the toast soggy after it has been buttered. Heretofore, toast has been stacked one piece on top of another resulting in both sides of the toast having butter thereon. Various other disadvantages are present in the prior art type of toast racks and serving dishes which need not be mentioned at this time.

One of the objects of my invention is to provide a combination covered butter dish and toast rack which will support pieces of toast in spaced relation after they have been buttered.

Another object of my invention is to provide a combination butter dish and toast rack which will take up little space on the table.

Another object of my invention is to provide a combination butter dish and toast rack which will support the toast in upright position and out of contact with any other piece of toast.

Another object of my invention is to provide a combination butter dish and toast rack which is of a relatively simple structure, thus making it easy to clean.

Various other objects and advantages will be apparent from the following detailed description and the drawing wherein.

Figure 1:
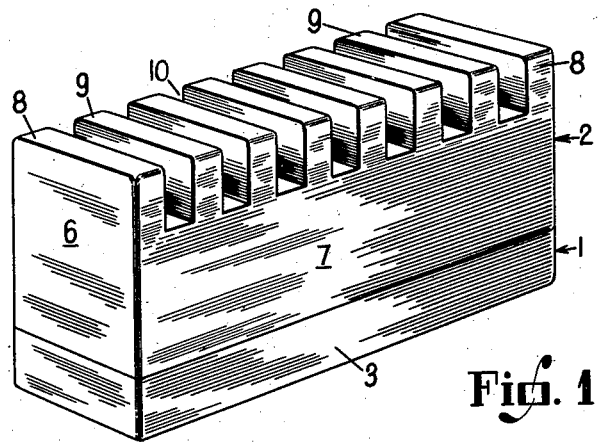
Figure 1 is a perspective view of a combination covered butter dish and toast rack constructed in accordance with my invention.
Figure 2:
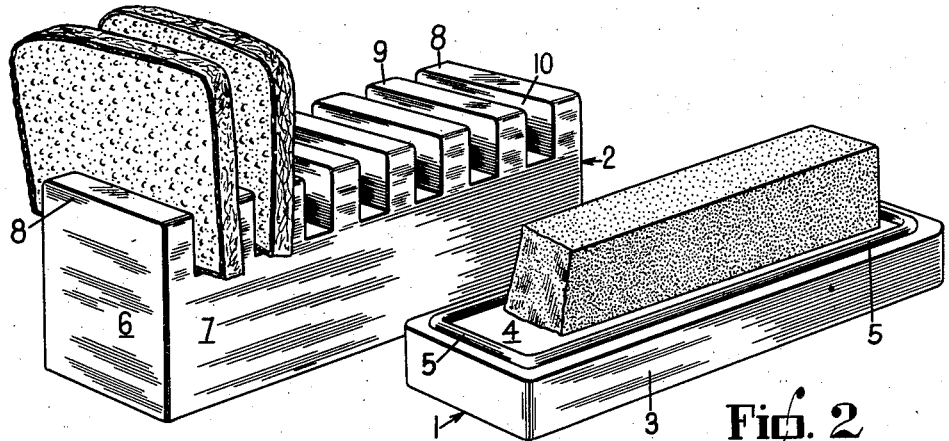
Figure 2 is a perspective view of the article shown in Figure 1 in disassembled relationship showing the dish portion supporting the butter and the rack supporting the pieces of toast.
Figure 3:
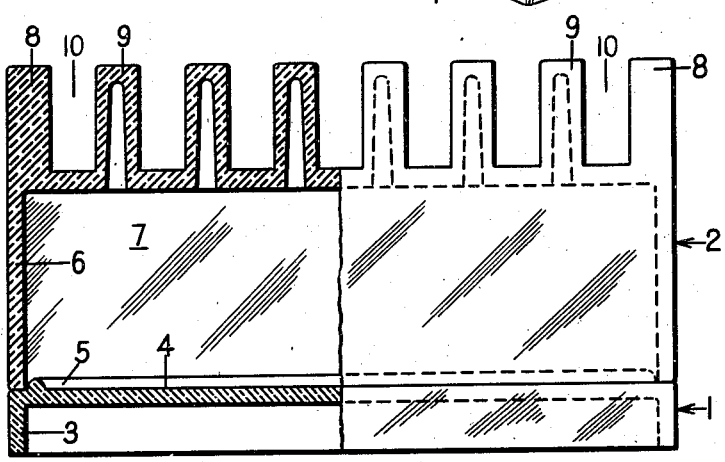
Figure 3 is a side elevational view of the covered butter dish and toast rack partly in section.

Referring to the drawing, more particularly to Figures 1 and 2, it will be seen that I provide a combination covered butter dish and toast rack consisting of a base or dish portion 1 and a cover and rack portion 2.

It will be seen that the base portion 1 and the cover and rack portion 2 are rectangular in shape, but it is understood that I do not intend to be limited to such shape. The base portion 1 has a depending flanged support 3 and has a material-receiving surface 4. The surface 4 is provided with a raised beaded member 5 extending completely around a suitable distance from the edge to accommodate the walls 6 and 7. The reason for this beaded portion will be hereinafter set forth.

The cover 2 is adapted to fit over the base member 1 in such a manner that the lower ends of the walls of the cover 2 engage the bead 5, thus holding it against sliding and in fixed position. The cover 2 has end walls 6 and side walls 7. The walls extend upwardly a substantial distance so that the cover portion will not come in contact with the material carried in the dish 4 of the base 1. The upper ends of the walls 6 and 7 are formed into channeled spacer members 8 and 9 which run transverse to the cover 2. The distance between the spacer members is preferably the thickness of an ordinary slice of bread so that a slice can be inserted between each two spaces.

The end spacers 8 are solid in cross section while the intermediate spaces 9 are hollow. The spacer members 8 and 9 are transversely disposed forming the channels 10 for receiving the toast and supporting it in an upright position as shown in Figure 2. While I show the tops of the spacers of substantially flat shape, I wish to point out that any shape of spacers could be used in supporting the toast in the manner set forth.

It will be seen from the above description and drawings that I provide a novel means for supporting butter in combination with a toast rack in which said rack is a part of the cover portion for the butter dish. While I preferably construct the combination covered butter dish and toast rack of glass, any other material can be used and will be just as efficient.

Having thus described my invention, what I claim is:

1. A covered butter dish formed of glass and comprising a lower base upon a section of butter or the like is adapted to be disposed, said base being of substantially rectangular cross-section and having a bead formed on its upper flat surface adjacent the edge thereof, an upper cover adapted to rest on the base, said cover being of rectangular cross-section having closed ends, a closed upper side and an open lower side so that it can be positioned over the butter on the base and its lower edge will rest on the upper flat surface of the base so that said bead will cooperate with said edge to prevent sliding of the cover relative to the base, a plurality of integral upstanding transversely extending toast spacer partitions formed on the top surface of the closed upper side of the cover, said spacer partitions being disposed in uniform longitudinally spaced relationship from one end of the cover to the other, the end partitions being solid in cross-section and being flush with the end walls of the cover while the intermediate spacer members are hollow in cross-section, adjacent partitions forming transversely extending channels therebetween which are adapted to receive slices of bread or the like and to support and retain them in upright edgewise position.

2. A covered butter dish comprising a lower base upon which a section of butter or the like is adapted to be disposed, said base being of substantially rectangular cross-section, an upper cover adapted to rest on the base, said cover being of rectangular cross-section having closed ends, a closed upper side and an open lower side so that it can be positioned over the butter on the base, means for preventing sliding of the cover relative to the base, a plurality of upstanding transversely extending toast spacer partitions formed on the top of the closed upper side of the cover, said spacer partitions being disposed in longitudinally spaced relationship, adjacent partitions forming transversely extending channels therebetween which are adapted to receive slices of bread or the like and to support and retain them in upright edgewise position.

THEODORE L. DANIELS.